United States Patent [19]
Smith et al.

[11] Patent Number: 6,044,557
[45] Date of Patent: Apr. 4, 2000

[54] METHOD OF MAKING STAMPED DRIVER INFLATOR BASE

[75] Inventors: Bradley W. Smith, Ogden; Kirk H. Rasmussen, West Point; Brian T. Snyder, Hooper, all of Utah

[73] Assignee: Autoliv ASP, Inc., Ogden, Utah

[21] Appl. No.: 08/914,647

[22] Filed: Aug. 19, 1997

Related U.S. Application Data

[62] Division of application No. 08/468,225, Jun. 6, 1995, Pat. No. 5,779,268.

[51] Int. Cl.⁷ ..................................................... B23P 13/04
[52] U.S. Cl. ..................... 29/897.2; 29/557; 29/DIG. 37; 280/741
[58] Field of Search ................... 29/897.2, 557, 29/DIG. 37; 72/334, 340, 379.6, 374, 352, 357, 360; 280/728.1, 741

[56] References Cited

U.S. PATENT DOCUMENTS

| | | | |
|---|---|---|---|
| 3,874,054 | 4/1975 | Reppert | 29/894.325 |
| 4,561,675 | 12/1985 | Adams et al. | 280/741 |
| 4,578,247 | 3/1986 | Bolieau | 280/741 |
| 4,722,551 | 2/1988 | Adams | 280/741 |
| 5,104,466 | 4/1992 | Allard et al. | 280/741 |
| 5,419,578 | 5/1995 | Storey et al. | 280/741 |
| 5,483,876 | 1/1996 | Davis et al. | 72/405.1 |
| 5,517,741 | 5/1996 | Reynolds et al. | 29/DIG. 37 |

*Primary Examiner*—David P. Bryant
*Attorney, Agent, or Firm*—Sally J. Brown

[57] ABSTRACT

A driver side inflator base for a vehicle safety system which is stamped from a thin sheet of aluminum. The base includes a central axis, a plurality of stamped concentric rings extending upwardly from a bottom of the base and spaced from the central axis. An interface attachment flange is provided for mounting the inflator, and a squib pocket extending about the central axis of the base is capable of holding a squib of the gas inflator. The concentric rings, attachment flange and squib pocket are all formed during the stamping of the base; thus, excessive machining is not required. Only minor machining is necessary to complete the base. The base of the present invention is designed to reduce the overall inflator cost, while maintaining the processing capability and quality of current bases.

4 Claims, 6 Drawing Sheets

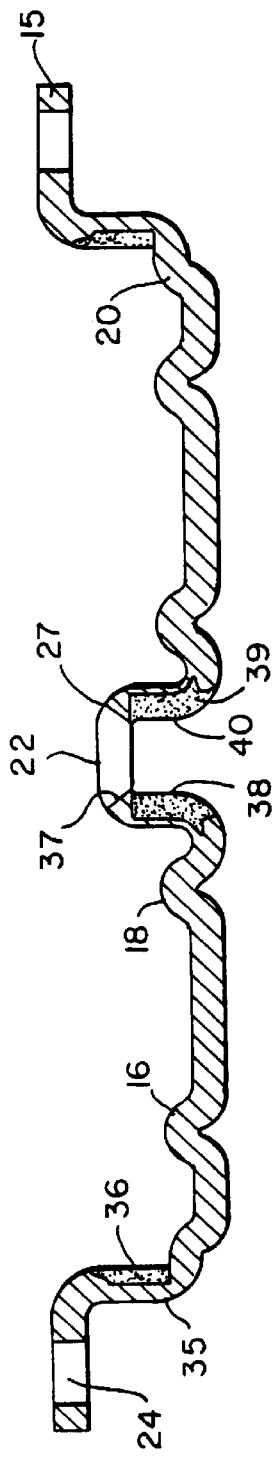
FIG. 6
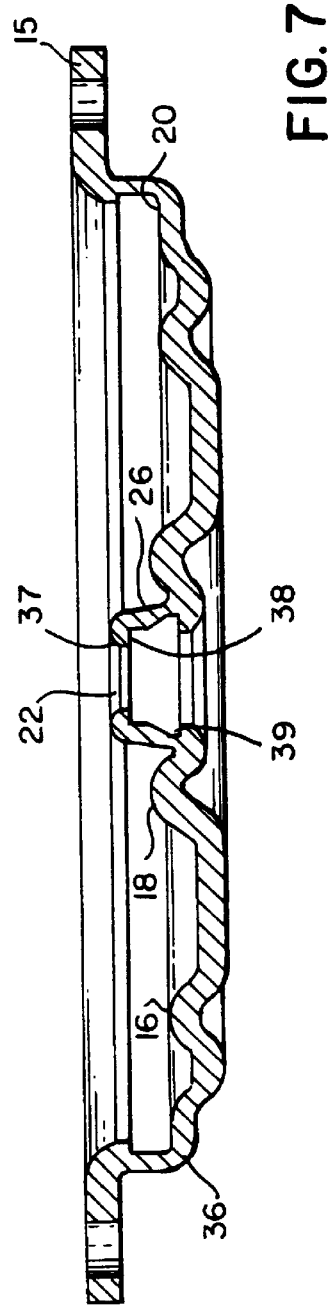
FIG. 7
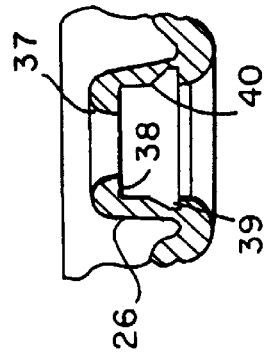
FIG. 9
FIG. 8

METHOD OF MAKING STAMPED DRIVER INFLATOR BASE

CROSS REFERENCE TO RELATED APPLICATION

This application is a divisional of U.S. application Ser. No. 08/468,225, filed on Jun. 6, 1995, now U.S. Pat. No. 5,779,268, by Bradley W. Smith, Kirk H. Rasmussen, and Brian T. Snyder.

BACKGROUND OF THE INVENTION

1. Field of the Invention

The present invention relates to a base of a housing of a driver side gas generator or inflator for a vehicle safety system, and more particularly, to a base of which a majority of the features are stamped from a thin sheet of material.

2. Description of the Related Art

Gas generators or inflators which use combustible solid fuel gas generant compositions for the inflation of inflatable crash protection or air bag restraint systems are known in the prior art.

One type of inflator, such as a driver side inflator apparatus, comprises a housing made of an upper shell or diffuser and a bottom shell or base. A plurality of concentric cylinders are formed in the diffuser. The cylinders together with the base form various chambers in the housing, an outer diffuser chamber, an inner ignitor chamber and a middle combustion chamber.

In operation, a crash sensor sends an electrical signal to an initiator or squib. The squib fires into the ignitor chamber and ruptures a container, which holds an ignitor material, commonly a mixture of boron and potassium nitrate. The ignitor material burns with a very hot flame and ignites solid fuel gas generant pellets contained in the combustion chamber. The pellets release a nitrogen gas, which travels through the diffuser chamber and into a protective air bag for protecting occupants of the vehicle.

Due to the enormous mechanical and thermal stresses produced, gas generators must be made from strong materials. U.S. Pat. No. 4,547,342, assigned to the assignee of the present invention, the disclosure of which is herein incorporated by reference, discloses a two-piece light weight aluminum inflator housing strong enough to withstand the associated stresses. Specifically, the inflator includes an aluminum diffuser shell and base shell, which are impact forged, heat treated and then finally machined to produce an inflator having the desired strength and shape.

Using an impact forging process for forming a part is well known in the art. During the impact forging process, the material to be processed, e.g. the slug, is placed into a die. The stroke of the die press causes the punch to force the material through openings between the punch and the die, or into cavities in the punch or die.

A disadvantage with the prior art impact forging process, is that a forged housing base requires excessive machining to form the base in its desired final shape. FIG. 1 illustrates a base 10' which has been formed by the impact forging process. The as forged part is shown by dashed line and the final shape of the part is indicated by the solid line. As shown, numerous areas of the forged base must be machined after the formation of the part. This significantly increases manufacturing cost and time.

U.S. Pat. No. 4,530,516, assigned to the assignee of the present invention and herein incorporated by reference, discloses an inflator housing including a housing structure comprising a stamped diffuser and base. Both the base and diffuser are significantly simpler in design than the other prior art inflator housing components. The base does not include weld lands, a squib pocket or an attachment flange. Also, the diffuser does not include concentric cylinders forming separate chambers. Due to the simplicity of the diffuser and base, extra parts, such as a cap, which holds the base and diffuser together, are required. This also significantly increases manufacturing time and cost.

Another disadvantage with the prior art stamped base is that the diffuser and base are electron-beam welded together, which is complex and time consuming. Electron beam welding is a well known process which involves fusion by local melting produced by bombardment of a high velocity stream of electrons.

Therefore, in order to continue to decrease manufacturing time and cost, it is desirable to produce a driver side inflator base, which can be manufactured simply and quickly.

SUMMARY OF THE INVENTION

It is an object of the present invention to overcome the deficiencies of the prior art by providing a driver inflator base having a shape which is substantially formed from stamping a thin sheet of material, with only minor machining necessary to form the final part.

Another object of the invention is to provide a stamping process through which the majority of the base features can be stamped. Thus, excessive machining after forming the part is not necessary.

The process of the present invention is designed to reduce the overall inflator cost, while maintaining the processing capability and quality of current bases.

Still another object of the invention is to provide a base which can be assembled without the necessity of complex welding procedures. Costs of the base parts would be significantly reduced, because parts made from stamping are typically less expensive than forged or machined parts. This is due in part to the lack of material waste, for example, 85% of the metal blank is used.

The present invention overcomes the above-noted deficiencies of the prior art by providing a stamped base which includes a central axis and a plurality of stamped concentric rings extending upwardly from a bottom of the base and spaced from the central axis. An interface attachment flange is provided for mounting to the module, and a squib pocket extending about the central axis of the base is capable of holding a squib of the gas inflator. The concentric rings, attachment flange and squib pocket are formed during the stamping of the base. Thus, only minor machining is necessary to complete the base.

The present invention also provides a method for stamping a base from a thin blank of material. The blank is positioned between a first set of dies and a squib pocket, for accommodating a squib of the gas inflator, is stamped about a central axis of the blank. Next, the blank is positioned between a second set of dies and an outer ring is stamped from the blank. The outer ring extends upwardly from the blank and is concentric with the central axis. The blank is then positioned between a third set of dies and a plurality of rings are stamped from the blank. The plurality of rings also extend upwardly from the base, spaced concentrically about the central axis and inwardly of the outer ring. Finally, the blank is positioned between another set of dies and the attachment flange is stamped. The attachment flange, provided for mounting the inflator, is located outwardly of the outer ring.

Other features and advantages of the present invention will become apparent from the following description of the invention, which refers to the accompanying drawings.

BRIEF DESCRIPTION OF THE DRAWINGS

FIG. 6 is a cross-sectional view of the stamped base blank of the present invention, indicating the areas which must be machined.

FIG. 7 is a cross-sectional view of the completed stamped base, taken along Line II—II of FIG. 10.

FIG. 8 is an enlarged detail of FIG. 7.

FIG. 9 is an enlarged detail of the squib pocket of FIG. 7.

DETAILED DESCRIPTION OF THE PREFERRED EMBODIMENT

Figure 1:
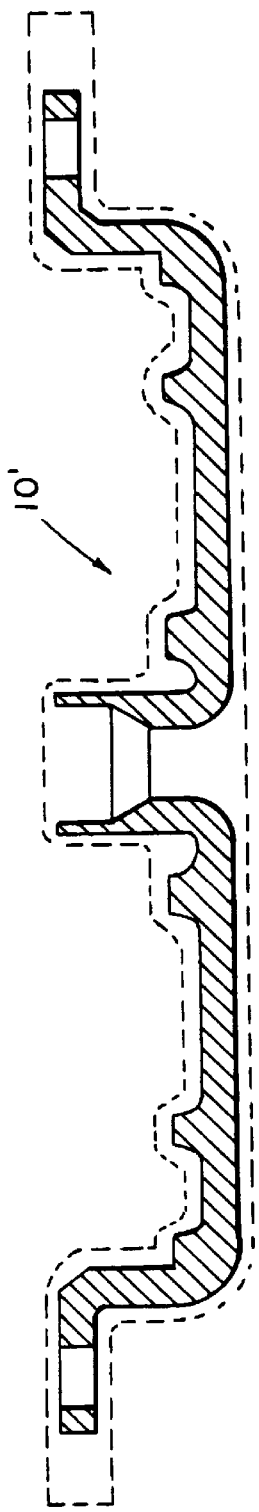
FIG. 1 is a cross-sectional view of a prior art impact forged housing base.
Figure 2:
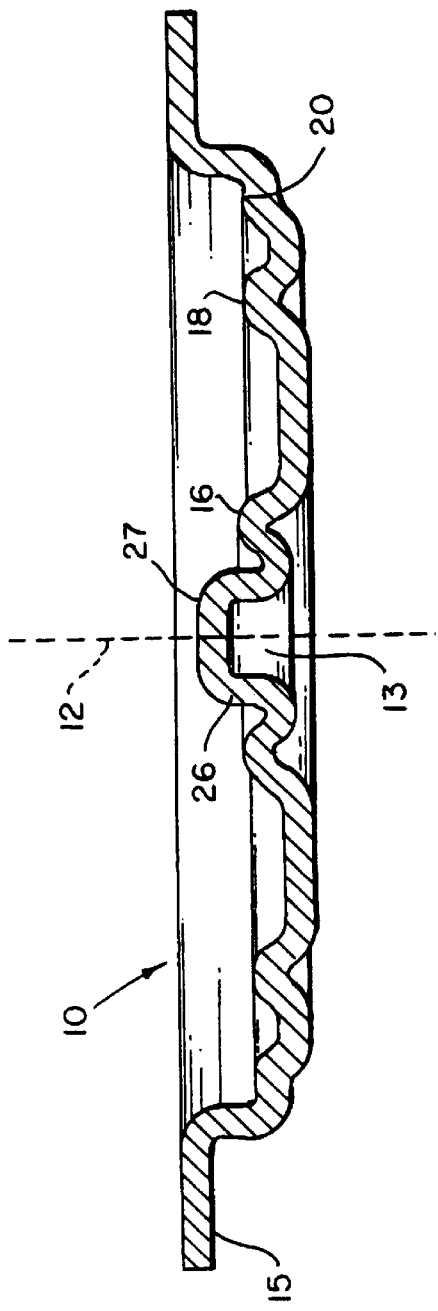
FIG. 2 is a cross-sectional view of a stamped base blank according to the present invention, taken along Line I—I of FIG. 3.
Figure 3:
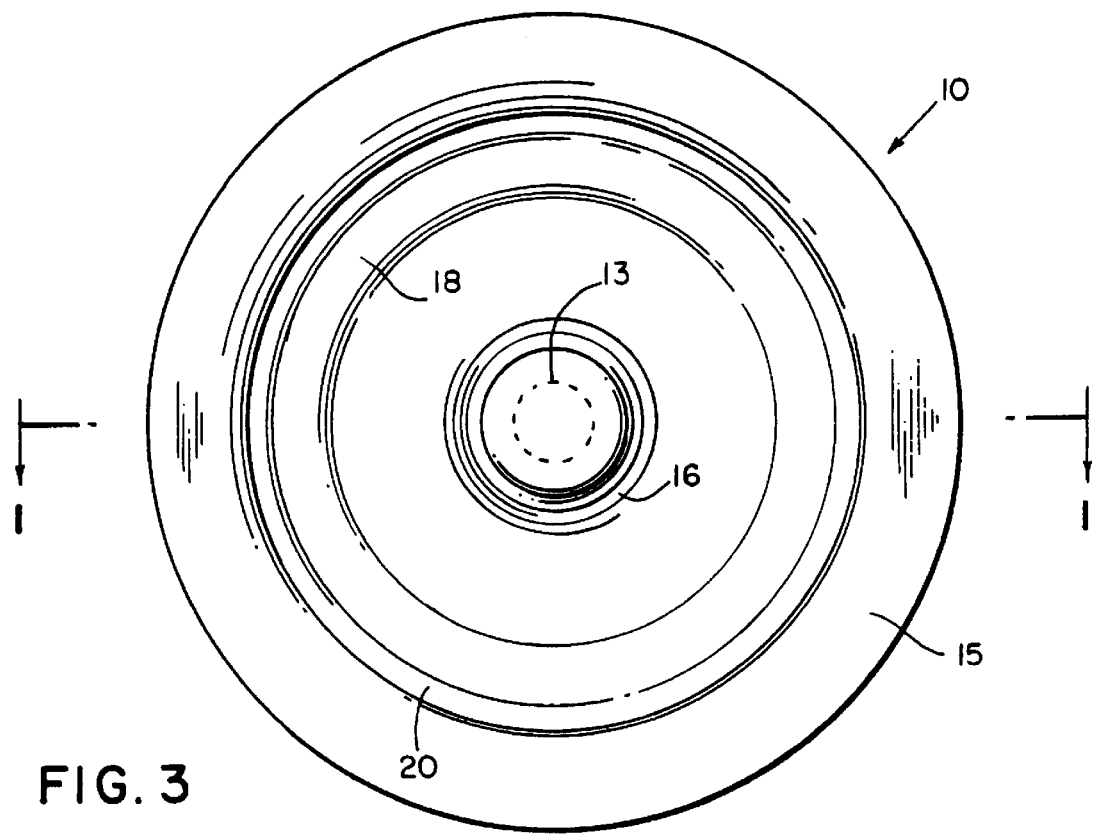
FIG. 3 is a top view of the stamped base blank of FIG. 2.

Referring to FIGS. 2 and 3, the present invention relates to a base 10 for a driver side inflator housing, which is stamped from a relatively thin sheet of material, such as aluminum. Preferably, the blank and the finished stamped part each have a thickness of about 0.125 in., and more preferably of 0.100 in. However, different material thicknesses can be used as desired.

The finish stamped base blank can be configured as shown in FIGS. 2 and 3. The base 10 includes a central axis 12, a squib pocket 13 formed about axis 12, an interface attachment flange 15, and a plurality of upwardly extending rings 16, 18, 20 spaced concentrically about axis 12. Squib pocket 13, after being machined, is capable of retaining a squib 50, which will be discussed in detail further herein.

Figure 10:
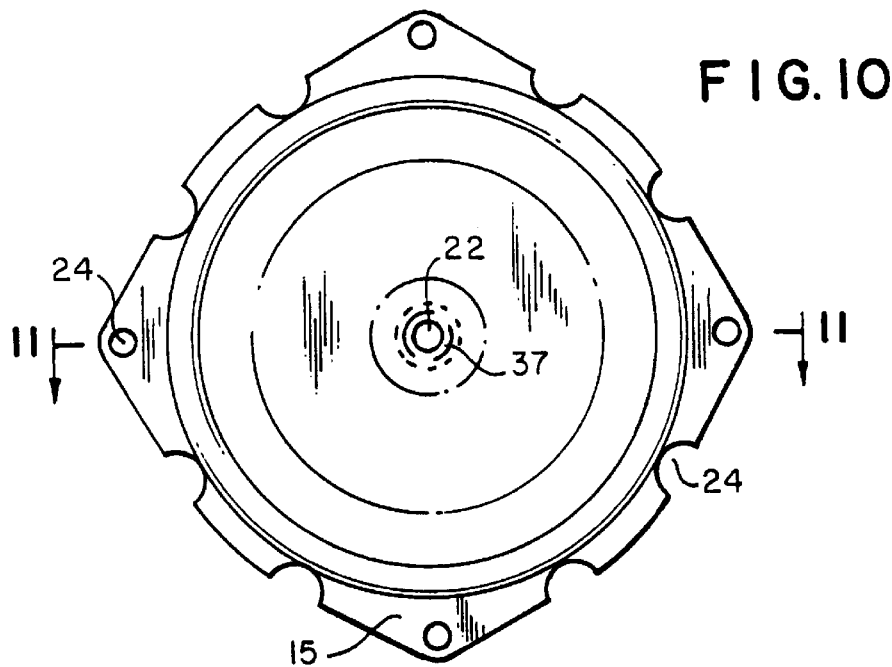
FIG. 10 is a top view of the stamped base of FIG. 7.

As shown in FIGS. 6, 7 and 10, the module interface attachment flange 15, which is provided for mounting the inflator to the airbag module (not shown), includes a plurality of apertures 24 spaced circumferentially thereabout. Apertures 24 provide the capability to inertia weld the base 10 to a diffuser 14, which will be described further herein. An upper wall 27 (FIG. 2) of squib pocket 13 will eventually include a hole 22, as shown in FIG. 10, for receiving the squib 50.

The base 10 of the present invention is produced by a stamping process. A plurality of different operations are preformed at different stations with the process continuing through a set of progressive die until the final stamped shape (shown in FIG. 2) is produced.

Figure 4:
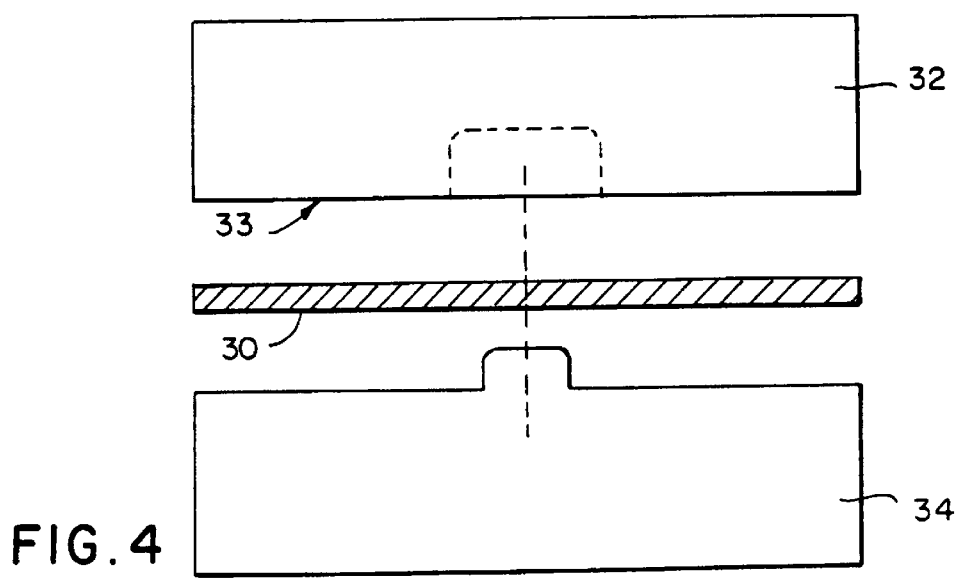
FIG. 4 illustrates a step in the process of stamping the base according to the present invention.

FIG. 4 illustrates a representative step in the stamping process. Initially, raw stock, shown in FIG. 4 as a round blank of material 30, most likely aluminum, travels to a first station and is positioned between two dies 32, 34, where a pre-draw of the center squib pocket 13 is preformed. Each and every punch die 32 is configured on its contact face 33 to produce the desired features or deformations at that particular step in the stamping process. It should be understood that variations of the above steps are contemplated, depending on the desired final shape of the part.

Figure 5A:
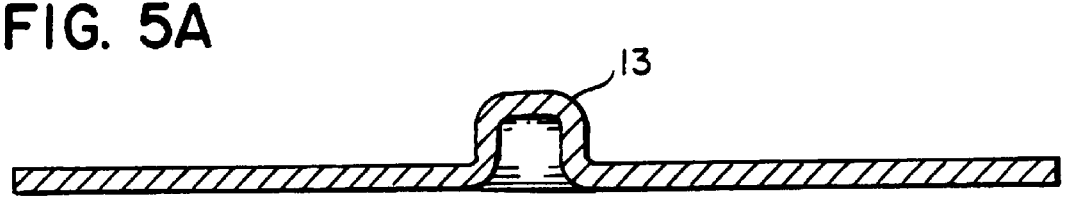
FIGS. 5A–5D are cross-sectional views of the blank at various stages during stamping.
Figure 5B:
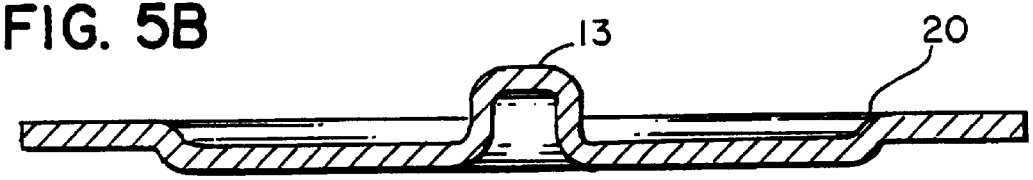
Figure 5C:
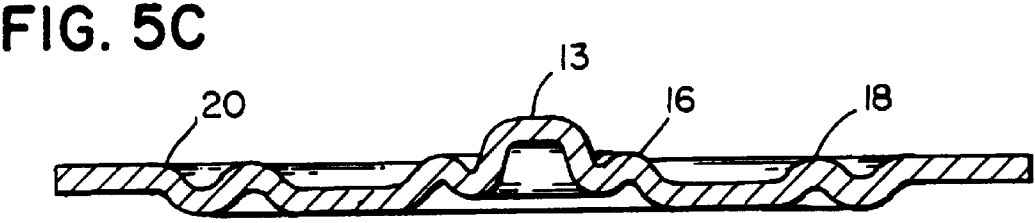
Figure 5D:
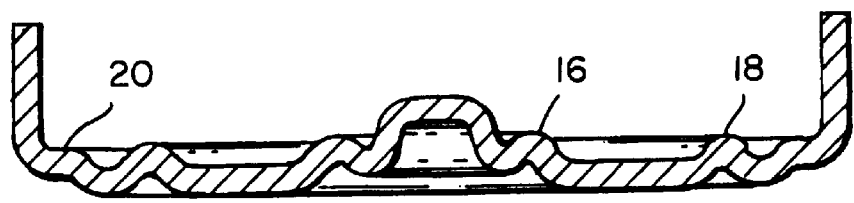

Referring to FIGS. 5A–5D, formation of the base at the various stamping stages will be described. Blank 30 travels to a second station where the squib pocket 13 is finish drawn, as shown in FIG. 5A. At a third set of dies, outer ring 20, is formed, as shown in FIG. 5B. Following this step, inner rings 16 and 18 are stamped at the next station of dies, (see FIG. 5C). Next, the perpendicular walls at the periphery of the base, leading to flange 15 are raised, as shown in FIG. 5D. In the sixth step, the base is finished formed, i.e., the base is drawn to its final stamped configuration, as shown in FIG. 2.

Referring to FIG. 6, the part is completed by pre-piercing the hole 22 in the squib pocket's upper wall 27. In the last steps in the stamping process, hole 22 is pierced to its final size, a chamfer 37 is formed at an edge of hole 22, and apertures 24 are blanked in the flange 15. Only minor machining at valley 36 and relief 40, which will be described further herein, is necessary to produce the finished base. Thus, a majority of the base features are stamped, limiting the need for extensive finish machining. Through this process approximately 85% of the metal blank is used, significantly reducing waste.

As described above, only minor machining, shown by the dotted areas in FIG. 6, is necessary to finish the stamped base as shown in FIG. 7. As shown in detail in FIG. 8, a small area is removed from the base to form valley 36. Valley 36 can be approximately 0.235 in. in height and after machining a typical wall thickness, indicated by numeral 35, may be, for example, 0.058 in. This machining on the periphery 36 is done so that the weld curl 66, shown in FIG. 11, can have room to move away from the diffuser 14. The valley 36 is removed in a high capacity lathe type operation. The base 10 is chucked into the lathe and the material is removed with a cutting tool.

Machining of the squib pocket 13 will be described with reference to FIGS. 6–10. The edge of hole 22 is coined to form chamfer 37. As will be described herein, chamfer 37 corresponds with a lower conical surface 51 of squib 50, shown in FIG. 11, when the squib is mounted in the inflator. Additionally, a conical seal washer (not shown) is located between chamfer 37 and surface 51 to provide a hermetic seal between the two parts. Chamfer 37 is coined by smashing the material into the desired shape, without moving the material to another location. Therefore, the material in the coined area, i.e. chamfer 37, becomes more dense.

Figure 12:
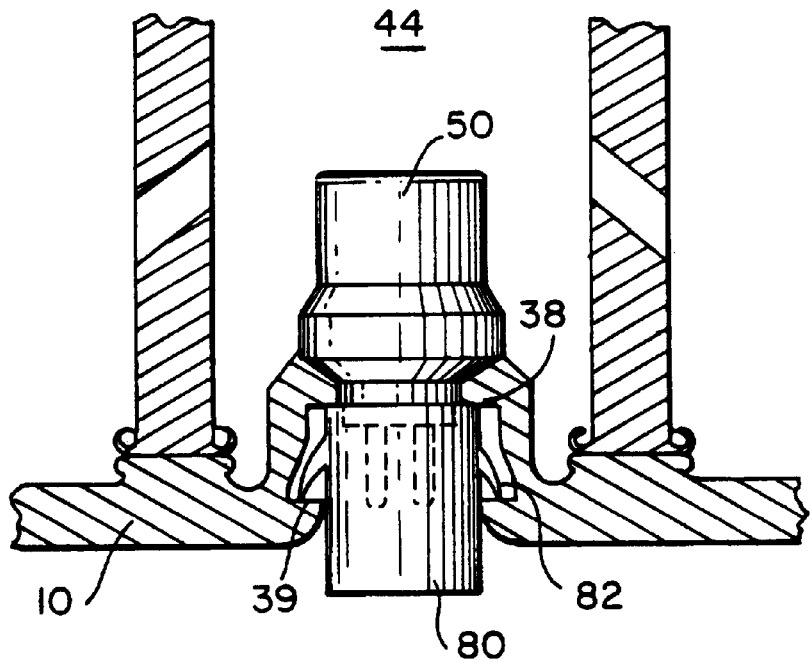
FIG. 12 is an enlarged cross-sectional view of the stamped base of the present invention with a universal connector engaged within the squib pocket of the base.

A significant amount of material is removed from the walls 26 of squib pocket 13 at relief 40, and shoulder 38 and notch 39 are formed. As shown in FIG. 12, squib pocket 13 is formed with notch 39 and shoulder 38 to accommodate a connector assembly 80. Connector 80 is pushed into pocket 13 after the squib 50 has been installed and the inflator welded. Connector 80 is the link to the electronics of the car used to fire the air bag inflator. Connector 80 includes an engaging rim 82 which engages notch 39 to retain the connector within the inflator during the life of the inflator. Relief 40 is formed by chucking base 10 in a lathe and cutting the material. The material is removed from relief 40 from a side of the base opposite the side from which the material of valley 36 is removed.

Referring again to FIG. 11, a cross-section of the two structural components comprising the housing of the inflator, namely upper shell or diffuser 14 and base 10 is shown. Diffuser 14 and base 10 are joined by three concentric inertia welds 54, 56 and 58, which will be discussed further herein. Diffuser 14 includes three different chambers, an innermost ignition chamber 44, a middle combustion chamber 46 and an outer diffuser chamber 48.

Ignition chamber 44 is designed to receive an ignitor charge assembly (not shown), as is customary. Extending into ignition chamber 44 is an initiator or squib 50. Squib 50, as shown, has conically shaped lower surface 51, which follows chamfer 37 of squib pocket 13 and an upper conical surface 52 that extends above central portion 12 of pocket 13. Squib 50 can be a conventional electric squib having a pair of energizing electric terminals 53, adapted for a plug-in connection to an external crash sensor means (not shown).

Combustion chamber 46 may be a conventional combustion chamber adapted to contain pellets of a gas generant composition (not shown). Also, outer diffuser chamber 48 can contain a conventional deflector ring or filter (not shown). See U.S. Pat. No. 4,547,342.

Figure 13:
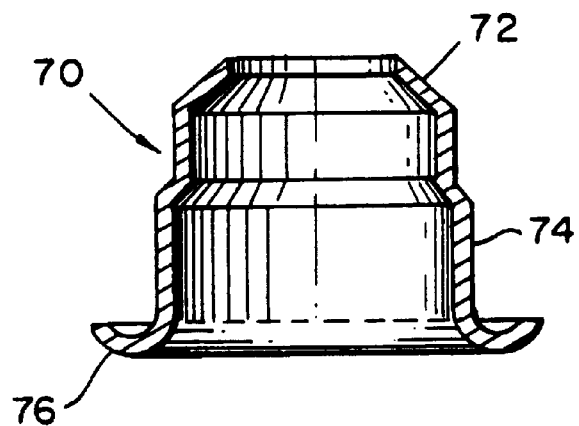
FIG. 13 is a cross-sectional view of the squib clamp of the present invention.

To provide a more stable retention of the squib 50 in base 10, a retainer 70 is provided. As shown in FIG. 13, retainer 70 includes an upper rim 72, a mid cylinder 74 and a flared bottom flange 76.

Referring once again to FIG. 11, rim 72 of the clamp overlaps and engages the upper conical surface 52 of squib 50 and the mid cylinder 74 engages the outer surface of walls 26 of squib pocket 13. Bottom flange 76 of retainer 70 is flared to mate with the curve formed between wall 26 and ring 16 of base 10.

Retainer 70 is press fit over the squib pocket and locks in place near the weld land. Once retainer 70 is pressed into place, the weld curl formed during the welding process will cover the bottom flange 76, holding the retainer securely in place.

Retainer 70 is also formed by stamping. The retainer is stamped from a thin piece of material, such as aluminum, in a manner similar to the base of the present invention. Thus, each step and progressive die set will add another feature to the retainer until the part is complete. It should be noted that various other configurations of the squib pocket, which would otherwise allow the squib to be pressed, staked or otherwise held in place during the lifetime of the inflator, are contemplated. Also, a squib pocket configuration which would eliminate the need for retainer 70 is possible. In that instance, a different type of squib and a deeper draw of the squib pocket may be necessary.

Figure 11:
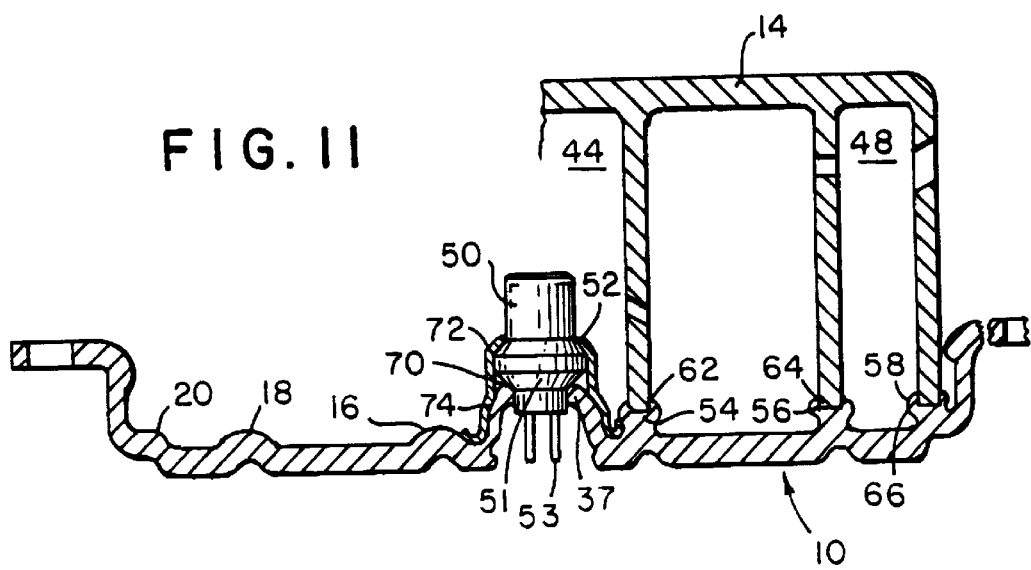
FIG. 11 is a partial cross-sectional view of a gas inflator incorporating the stamped base of the present invention.

As shown in FIGS. 2, 7 and 11, the concentric interface regions of base 10, which meet with the walls of chambers 44, 46 and 48, comprise short concentric-like rings 16, 18, and 20. During the formation of the inertia welds 54, 56 and 58, weld curls indicated at 62, 64 and 66, respectively, form around the ends of the walls of chambers 44, 46 and 48.

The inertia welds 54, 56 and 58 are preformed simultaneously in a single inertia welding step. The diffuser 42 and base 10 are welded in a wholly loaded condition, i.e. the squib, ignitor material, gas pellets etc., are loaded within the diffuser assembly.

As fully set forth in U.S. Pat. Nos. 4,561,675 and 5,104,466, assigned to the assignee of the present invention, and herein incorporated by reference, in the inertia welding operation, the base 16 is rotated beneath the loaded diffuser 14 by a power driven clutch means (not shown) to a speed, for example, 3000 r.p.m. Upon reaching such a speed, the clutch is activated to disconnect the power source and the freely spinning base 10 is raised upwardly to bring concentric rings 16, 18 and 20 into contact with the lower ends of the walls of the respective chambers 44, 46 and 48. The resulting friction stops the spinning of the base 10 in a fraction of a second, but raises the temperature of each of the areas of contact sufficiently to cause consolidation of the metal of the diffuser and base in such areas. Pressure is maintained between the diffuser and base for a short time, for example, one to two seconds, to allow the welds 54, 56 and 58 to solidify.

Weld curls 62, 64 and 66 are a natural result of the inertia welding process. When the two parts are pressed together at the same time the part or parts are spinning, as described above, a certain amount of material curls off the weld lands, i.e. rings 16, 18 and 20, and results in a welded part with weld curls 62, 64 and 66 around the area where the parts are engaged. The process described above contemplates the use of a vertical welder. However, the same procedure can be accomplished in a horizontal configuration.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of stamping a base for a housing of a gas generated inflator of a vehicle safety system, comprising the steps of:
   (a) providing a thin blank of material;
   (b) positioning the blank of material between a first set of dies;
   (c) stamping a squib pocket about a central axis of said blank between said first set of dies for accommodating a squib of the gas inflator;
   (d) positioning the blank between a second set of dies;
   (e) stamping an outer ring from said blank between said second set of dies, said outer ring extending upwardly from said blank and being concentric with the central axis;
   (f) positioning the blank between a third set of dies;
   (g) stamping a plurality of rings from said blank between said third set of dies, said plurality of rings extending upwardly from said blank and being spaced concentrically about the central axis and inwardly of said outer ring;
   (h) positioning the blank between a fourth set of dies; and
   (i) stamping an attachment flange from the blank between said fourth set of dies, outwardly of said outer ring, for mounting the inflator.

2. The method of claim 1, further comprising the step of piercing a hole in an upper wall of said squib pocket and coining a chamfer on an edge of said hole in said squib pocket.

3. The method of claim 1, further comprising the step of piercing a plurality of apertures in said attachment flange.

4. The method of claim 1, further comprising the step of machining a shoulder and a notch in an inner surface of a side wall of said squib pocket for retaining a universal connector of the vehicle safety system within said squib pocket.

* * * * *